(12) United States Patent
Hu et al.

(10) Patent No.: US 11,241,655 B2
(45) Date of Patent: Feb. 8, 2022

(54) DRAW SOLUTE FOR A FORWARD OSMOSIS PROCESS

(71) Applicant: NANYANG TECHNOLOGICAL UNIVERSITY, Singapore (SG)

(72) Inventors: Xiao Hu, Singapore (SG); Yufeng Cai, Singapore (SG); Rong Wang, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 15/128,424

(22) PCT Filed: Mar. 25, 2015

(86) PCT No.: PCT/SG2015/000094
§ 371 (c)(1),
(2) Date: Sep. 22, 2016

(87) PCT Pub. No.: WO2015/147749
PCT Pub. Date: Oct. 1, 2015

(65) Prior Publication Data
US 2018/0008933 A1    Jan. 11, 2018

Related U.S. Application Data
(60) Provisional application No. 61/969,992, filed on Mar. 25, 2014.

(51) Int. Cl.
*B01D 61/00* (2006.01)
*C02F 1/44* (2006.01)
*C02F 1/14* (2006.01)

(52) U.S. Cl.
CPC ............ *B01D 61/005* (2013.01); *C02F 1/445* (2013.01); *C02F 1/14* (2013.01); *C02F 2303/16* (2013.01); *Y02W 10/37* (2015.05)

(58) Field of Classification Search
CPC ................ B01D 61/002; B01D 61/005; B01D 2311/10; B01D 2311/103; C02F 1/445;
(Continued)

(56) References Cited

U.S. PATENT DOCUMENTS

2010/0155329 A1*  6/2010  Iyer ..................... B01D 61/002
                                                            210/636
2013/0032538 A1   2/2013  Iyer
(Continued)

FOREIGN PATENT DOCUMENTS

AU       2015237315 B2    10/2015
EP          2489424 A1 *   8/2012   ........... B01D 61/002
(Continued)

OTHER PUBLICATIONS

Cai et al. Energy-efficient desalination by forward osmosis using responsive ionic liquid draw solutes. Environ. Sci.: Water Res. Technol., 2015, 1, 341-347. (Year: 2015).*

(Continued)

*Primary Examiner* — Benjamin L Lebron (57) ABSTRACT

A draw solute for a forward osmosis process, the draw solute comprising: a thermally responsive ionic compound having at least one of: a lower critical solution temperature (LCST) and an upper critical solution temperature (UCST), the draw solute being regeneratable from a diluted aqueous draw solution after forward osmosis via one of: liquid-liquid phase separation and solid-liquid phase separation, the draw solute being regeneratable when the diluted aqueous draw solution is at a temperature selected from one of: above the LCST and below the UCST.

14 Claims, 9 Drawing Sheets

(58) Field of Classification Search
CPC .......... C02F 2103/08; C02F 1/44; C02F 1/14; C02F 2303/16
See application file for complete search history.

(56) References Cited

U.S. PATENT DOCUMENTS

| | | | | |
|---|---|---|---|---|
| 2013/0180919 A1* | 7/2013 | Kim | ........................ | C08F 22/38 210/648 |
| 2013/0240444 A1* | 9/2013 | Jung | .................... | B01D 61/002 210/648 |
| 2014/0076810 A1* | 3/2014 | Jessop | ....................... | C02F 1/68 210/638 |
| 2014/0158621 A1* | 6/2014 | Lee | ........................ | C02F 1/445 210/642 |
| 2014/0217026 A1* | 8/2014 | Han | ........................ | C02F 1/445 210/644 |
| 2015/0291787 A1* | 10/2015 | Guymon | .............. | B01D 61/005 210/644 |

FOREIGN PATENT DOCUMENTS

| | | |
|---|---|---|
| EP | 2641927 A1 | 10/2014 |
| KR | 20130002666 A * | 1/2013 |
| WO | 2013148289 A1 | 10/2013 |
| WO | 2014175834 A1 | 10/2014 |
| WO | 2015147749 A1 | 10/2015 |

OTHER PUBLICATIONS

Kohno et al. Ionic liquid/water mixtures: from hostility to concilation. Chem. Commun. 2012, 48, 7119-7130. (Year: 2012).*
P. Aldhous, Nature, 2003, 422, 251.
M. Elimelech and W. A. Phillip, Science, 2011, 333, 712.
M. F. A. Goosen, S. S. Sablani, H. Al-Hinai, S. Al-Obeidani, R. Al-Belushi and D. Jackson, Separation Science and Technology, 2005, 39, 2261.
A. Bajpayee, T. Luo, A. Muto and G. Chen, Energy & Environmental Science, 2011, 4, 1672.
K. N. Knust, D. Hlushkou, R. K. Anand, U. Tallarek and R. M. Crooks, Angew Chem Int Ed Engl, 2013, 52, 8107-8110.
C. Klaysom, T. Y. Cath, T. Depuydt and I. F. J. Vankelecom, Chemical Society Reviews, 2013, 42, 6959.
B. Mi and M. Elimelech, Journal of Membrane Science, 2010, 348, 337.
C. Tan and H. Ng, Desalination and Water Treatment, 2010, 13, 356.
M. L. Stone, A. D. Wilson, M. K. Harrup and F. F. Stewart, Desalination, 2013, 312, 130.
Q. Ge, J. Su, G. L. Amy and T. S. Chung, Water Res, 2012, 46, 1318.
R. E. Kravath and J. A. Davis, Desalination, 1975, 16, 151.
Q. Ge and T.-S. Chung, Chemical Communications, 2013, 49, 8471.
Q. Zhao, N. Chen, D. Zhao and X. Lu, ACS Applied Materials & Interfaces, 2013, 5, 11453.
Z. Liu, H. Bai, J. Lee and D. D. Sun, Energy & Environmental Science, 2011, 4, 2582.
Y. Cai, W. Shen, R. Wang, W. B. Krantz, A. G. Fane and X. Hu, Chemical Communications, 2013, 49, 8377.
M. L. Stone, C. Rae, F. F. Stewart and A. D. Wilson, Desalination, 2013, 312, 124.
Y. C. Kim, S. Han and S. Hong, Water Science & Technology, 2011, 64, 469.
Y. Cai, W. Shen, S. L. Loo, W. B. Krantz, R. Wang, A. G. Fane and X. Hu, Water Res, 2013, 47, 3773.
R. Ou, Y. Wang, H. Wang and T. Xu, Desalination, 2013, 318, 48.
B. K. Jung, J. E. Kim, S. S. Han, H. Kang, H. R. Kang and J. Im Han, U.S. Appl. No. 13/845,471, filed 2013.
Y. Mok, D. Nakayama, M. Noh, S. Jang, T. Kim and Y. Lee, Phys Chem Chem Phys, 2013, 15, 19510.
J. R. McCutcheon, R. L. McGinnis and M. Elimelech, Desalination, 2005, 174, 1.
K. E. Gutowski, G. A. Broker, H. D. Willauer, J. G. Huddleston, R. P. Swatloski, J. D. Holbrey and R. D. Rogers, Journal of the American Chemical Society, 2003, 125, 6632.
K. Fukumoto and H. Ohno, Angew Chem Int Ed Engl, 2007, 46, 1852.
S. Saita, Y. Kohno and H. Ohno, Chemical Communications, 2013, 49, 93.
J. Wei, C. Qiu, C. Y. Tang, R. Wang and A. G. Fane, Journal of Membrane Science, 2011, 372, 292.
L. Zhang, Z. Xu, Y. Wang and H. Li, The Journal of Physical Chemistry B, 2008, 112, 6411.
R. L. McGinnis and M. Elimelech, Desalination, 2007, 207, 370.
R. Semiat, Environmental Science & Technology, 2008, 42, 8193.
C. P. Fredlake, J. M. Crosthwaite, D. G. Hert, S. N. Aki and J. F. Brennecke, Journal of Chemical & Engineering Data, 2004, 49, 954-964.
D. Batra, D. N. Hay and M. A. Firestone, Chemistry of Materials, 2007, 19, 4423-4431.
Foreign Communication From a Related Counterpart Application, International Search Report and Written Opinion dated Jun. 23, 2015, International Application No. PCT/SG2015/000094 filed on Mar. 25, 2015.
Foreign Communication from a Related Counterpart Application, Australian Office Action dated Mar. 26, 2019, Australian Application No. 2015237315 filed on Mar. 25, 2015.
Foreign Communication from a Related Counterpart Application, Australian Office Action dated Nov. 5, 2019, Australian Application No. 2015237315 filed on Mar. 25, 2015.
Foreign Communication from a Related Counterpart Application, Australian Certificate of Grant dated Jun. 25, 2020, Australian Application No. 2015237315 filed on Mar. 25, 2015.

* cited by examiner

DRAW SOLUTE FOR A FORWARD OSMOSIS PROCESS

CROSS-REFERENCE TO RELATED APPLICATIONS

The present application is a filing under 35 U.S.C. 371 as the National Stage of International Application No. PCT/SG2015/000094, filed Mar. 25, 2015, entitled "A DRAW SOLUTE FOR A FORWARD OSMOSIS PROCESS," which claims the benefit of U.S. Provisional Application No. 61/969,992 filed on Mar. 25, 2014, both of which are incorporated herein by reference in their entirety for all purposes

FIELD OF THE INVENTION

This invention relates to a draw solute for a forward osmosis process, and in particular to a draw solute for forward osmosis desalination.

BACKGROUND OF THE INVENTION

Water scarcity has been recognised as a global crisis for a long time.[1] While wastewater reclamation partially relieves water shortage, only desalination technologies can broaden our water source to the sea, which occupies majorities of the water. One of the currently prevalent seawater desalination technologies is reverse osmosis (RO) whose energy consumption has been largely reduced after decades of development.[2] However, the high pressure needed in RO and the concomitant membrane fouling[3] are still inherent drawbacks of reverse osmosis.

Although some membrane-free desalination technologies[4,5] have been proposed, forward osmosis (FO) desalination technology is believed to be a practical solution for water scarcity.[6] The water permeation in FO is an energy-input-free process driven by the osmotic pressure difference of draw solution and feed solution, and the membrane fouling is much less severe due to absence of hydraulic pressure.[7] However, despite rapid advances in membrane technology, lack of suitable draw solutes has become a paramount obstacle jeopardizing the future of FO desalination. Although a few draw solutes reported have shown some promises, the choice is still very limited. The need of an ideal balance between high osmotic pressure and ease of regeneration in selecting draw solutes is obvious in principle but extreme challenging to reach. Many non-functional draw solutes including inorganic and organic salts,[8,9] polyelectrolytes[10], glucose[11] and hydroacid complexes[12] can generate sufficiently high osmotic pressure for seawater desalination. However, their applications are limited due to their energy-consuming processes to separate the draw solute and water from the diluted draw solution. In this case, the hydraulic pressure involved needs to be higher than the osmotic pressure of diluted draw solution, which, by default, is higher than the osmotic pressure of the feed solution. Therefore, the net energy consumption of FO desalination with such draw solutes is unlikely to be lower than that of the best RO process.

One method to significantly lower the energy consumption for draw solute regeneration is to use 'smart' or responsive draw solutes. Such responsive draw solutes undergo certain change upon external stimuli which enabled them to be separated from the diluted draw solutions using low energy consuming methods such as micro-filtration (MF) or non-filtration methods. This allows substantial reduction of draw solute concentration in the diluted draw solution. Therefore, any subsequent processes, e.g., ultrafiltration (UF), is for water recovery from a solution of substantially lower osmolality than the initial feed water or for water polishing to remove the trace amount residual draw solute. Up to now, magnetically[13,14], $CO_2$[15,16] or thermally responsive draw solutes have been proposed. However, magnetically responsive nanoparticles suffer from lower osmotic pressure, nanoparticle agglomeration and ineffective separation[17], and $CO_2$ responsive draw solutes are promising but required extra processes of incorporating and removal of $CO_2$.

Among existing draw solutes that have been developed, only an ammonium bicarbonate system[28] involved an energy estimation. Thermal energy was used to raise the temperature above 60° C. to decompose draw solute into carbon dioxide and ammonium and separating these two gases coincides with large water evaporation. Although low energy consumption of 0.84 KWh/m³ was reported, this was questioned by others[29].

SUMMARY OF INVENTION

The present invention is a draw solute for a forward osmosis process comprising a single-component thermally responsive ionic liquid or compound. The draw solution can draw water from difficult brine with salinity as high as 1.6 M NaCl. At the same time, some of these draw solutes have a lower critical solution temperature (LCST) of around 40° C., making it convenient to scavenge inexpensive or free solar heat and industrial waste heat. The supernatant after phase separation of a diluted draw solution comprising the draw solute after forward osmosis has low osmotic pressure that minimizes the hydraulic pressure needed to regenerate draw solute and produce purified water in a nanofiltration (NF) process. With the help of thermal energy from the sun or industry, the estimated energy consumption is 23% of current RO seawater desalination.

Thermally responsive draw solutes are advantageous because of its simplicity and the possibility of utilizing solar thermal energy or industrial waste heat. In this invention, thermally responsive ionic liquids or compounds are used as the draw solutes for forward osmosis seawater desalination with lower energy consumption than RO. While traditional NIPAm[19] or other thermally responsive non-ionic oligmer based[20,21] copolymers can sparingly draw water from seawater, the present thermally responsive ionic liquids or compounds can draw water from 1.6 M NaCl feed solution, which is almost three times the salinity of normal seawater. When the temperature is increased above the LCST (i.e. above 32~49° C.), the diluted draw solution undergoes a liquid-liquid phase separation. While the sedimentation phase containing very high draw solute concentration can be reused directly as the draw solution again without further treatment, the water-rich supernatant phase has an osmotic pressure of less than 6 bar. Therefore, much lower hydraulic pressure, or rather, energy than seawater (osmotic pressure ~27 bar) RO is needed in the regeneration process with NF membrane assuming higher water permeability than RO membrane. In addition, the produced water quality is much better than that from thermolytic $CO_2/NH_3$ system[22].

Using ionic liquids or compounds with LCST as new FO draw solutes is motivated by their unique combination of ionic characteristics, low molecular weight, low LCST and very special phase transition behaviour. This new class of draw solutes not only shows promise of reducing energy consumption of FO desalination to be considerably lower than the state-of-the-art seawater RO process, but also can desalinate difficult water with higher salinity than seawater.

According to a first aspect, there is provided a draw solute for a forward osmosis process, the draw solute comprising: a thermally responsive ionic compound having at least one of: a lower critical solution temperature (LCST) and an upper critical solution temperature (UCST), the draw solute being regeneratable from a diluted aqueous draw solution after forward osmosis via one of: liquid-liquid phase separation and solid-liquid phase separation, the draw solute being regeneratable when the diluted aqueous draw solution is at a temperature selected from one of: above the LCST and below the UCST.

The ionic compound may comprise an organic cation and an organic anion.

Alternatively, the ionic compound may comprise an organic ion and an inorganic ion, wherein the organic ion is one of: a cation and an anion, and wherein the inorganic ion is the other of: the cation and the anion.

The cation may be one selected from the group consisting of: phosphonium, ammonium, imidazolium, pyridinium, pyrrolidinium, sulfonium, morpholinium and a metallic cation.

The anion may be one selected from the group consisting of: halide, sulfonate, alkylsulfate, tosylate, methane sulfonate, nitride, carboxylate, alkoxide, tetrafluoroborate, hexafluorophosphates, dihydrogen phosphate, tricyanomethanide and bis(trifluoromethylsulfonyl)imide.

The draw solute may comprise a zwitterion.

The draw solute may be amphiphilic.

A sedimentation phase of one of: the liquid-liquid phase separation and solid-liquid phase separation may be directly reusable as the draw solution for the forward osmosis process.

Osmolality of the draw solution may increase monotonically and not linearly with molality of the draw solution.

The thermally responsive ionic compound may comprise one of: tetrabutylphosphonium 2,4-dimethylbenzenesulfonate ($P_{4444}$DMBS), tetrabutylphosphonium mesitylenesulfonate ($P_{4444}$TMBS) and tributyloctyl-phosphonium bromide ($P_{4448}$Br).

The LCST of the thermally responsive ionic compound may be in the range of 32° C. to 49° C.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Exemplary embodiments of the draw solute for a forward osmosis process will be described below with reference to FIGS. 1 to 9.

Materials and Instruments

Tributyloctyl phosphonium bromide was purchased from Wako Pure Chemical Industries. Sodium mesitylenesulfonate, sodium 2,4-dimethylbenzenesulfonate and tetrabutylphosphonium bromide were purchased from Tokyo Chemical Industry CO., Ltd. Anhydrous dichloromethane (>99.8%) and sodium chloride (>99.5%) were purchased from Sigma-Aldrich. All chemicals were used without further purification. A forward osmosis membrane used to study the draw solutes was prepared according to a reported method.[26] A nanofiltration membrane with molecular weight cut-off (MWCO) of 270 Da was purchased from Dow FilmTec. The osmolality of the draw solution was measured by a cryoscopic method using OSMOMAT 030, Gonotech. Water flux was measured by a cross-flow setup with flow rate of 4 ml/s, and the effective membrane area was fixed at 15 mm×30 mm orientated in PRO mode throughout this study. Water content in the draw solution was measured by Karl Fischer titration. Viscosity was measured by a Physica MCR 101 rheometer, Anton Paar.

Draw Solute Synthesis

Figure 1:
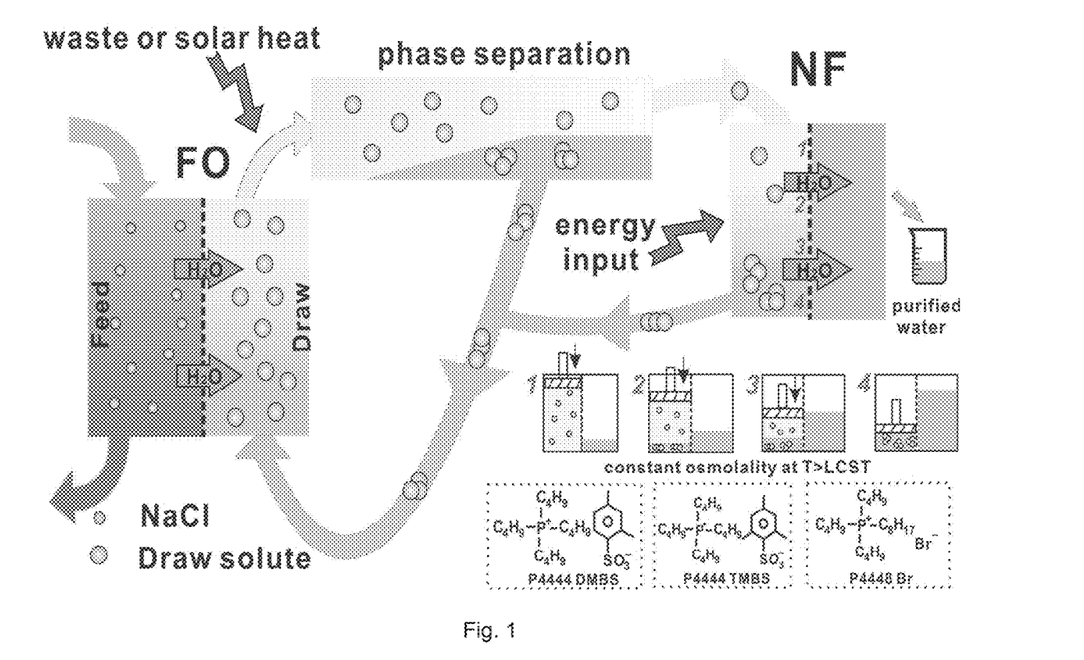
FIG. 1 is a schematic illustration of FO seawater desalination with three thermally responsive ionic liquids as draw solutes.

Three exemplary thermally responsive draw solutes were prepared and studied. Their structures are illustrated in FIG. 1.

Tetrabutylphosphonium 2,4-dimethylbenzenesulfonate ($P_{4444}$DMBS) was synthesized through ion exchange reactions: aqueous solutions of tetrabutylphosphonium bromide and slightly excess equal molar of sodium 2,4-dimethylbenzenesulfonate were mixed to form a rough 40 wt % solution and stirred at room temperature for 24 hours. The ionic liquid was extracted by dichloromethane and washed with deionized water for several times. The dichloromethane phase was then put in an evaporator to remove the organic solvent in vacuum (~1 mbar) for 24 hours at 100° C. Tetrabutylphosphonium mesitylenesulfonate ($P_{4444}TMBS$) was prepared using a similar method from tetrabutylphosphonium bromide and sodium mesitylenesulfonate. The third ionic liquid tributyloctyl-phosphonium bromide ($P_{4448}Br$) was used as received. $P_{4444}TMBS$ ($^1H$, 400 MHz, $CDCl_3$, δ/ppm relative to TMS): 0.89-0.92 (t, 12H, $CH_3$), 1.42-1.47 (m, 16H, $CH_2$), 2.17 (s, 3H, $CH_3$), 2.24-2.31 (m, 8H, $CH_2$), 2.66 (s, 6H, $CH_3$), 6.75 (s, 2H, Ar—H). $P_{4444}DMBS$ ($^1H$, 400 MHz, $CDCl_3$, δ/ppm relative to TMS): 0.72-0.76 (t, 12H, $CH_3$), 1.23-1.27 (m, 16H, $CH_2$), 2.00-2.07 (m, 8H, $CH_2$), 2.11 (s, 3H, $CH_3$), 2.50 (s, 3H, $CH_3$), 6.72-6.74 (d, 1H, Ar—H), 6.78 (s, 1H, Ar—H), 7.66-7.68 (d, 1H, Ar—H). At room temperature, $P_{4444}DMBS$ is a colorless viscous liquid while $P_{4444}TMBS$ and $P_{4448}Br$ are in wax form.

Figure 5:
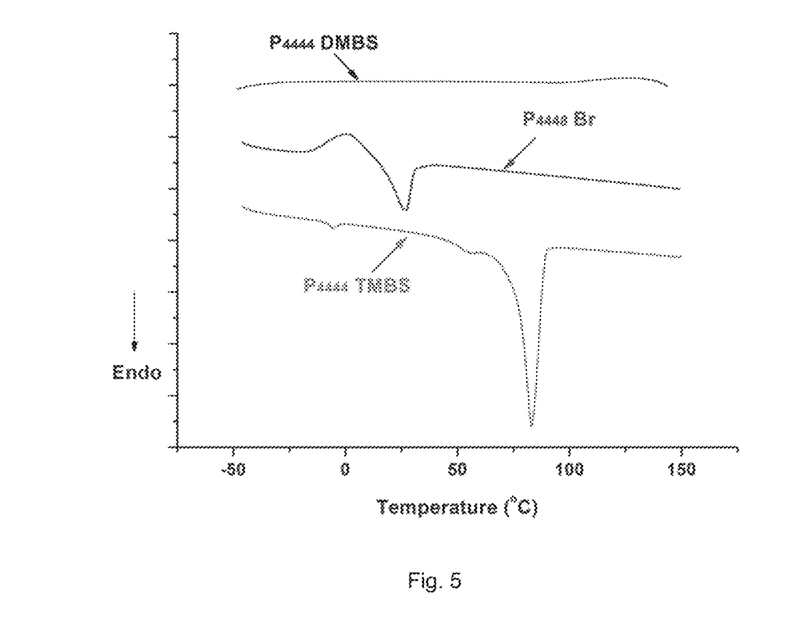
FIG. 5 is a graph of DSC results of the three ionic liquids.

DSC results of the three ionic liquids are shown in FIG. 5 in which the temperature increase/decrease rate was 3° C./min under $N_2$ sweep. The $P_{4444}DMBS$ is a colorless viscous liquid at wide temperature range from −50° C. to 150° C. $P_{4444}TMBS$ and $P_{4448}Br$ are waxes at room temperature with melting points of ~80° C. and ~25° C., respectively. The exothermic peak on $P_{4448}Br$ at around −3° C. is probably the cold crystallization peak, which is commonly observed in ionic liquids[30, 31]. The osmolalities of ionic liquids with concentrations higher than 30 wt % cannot be measured by cryoscopic method with OSMOMAT 030, but can be predicted by extrapolating the measured results in low concentrations.

Figure 2A:
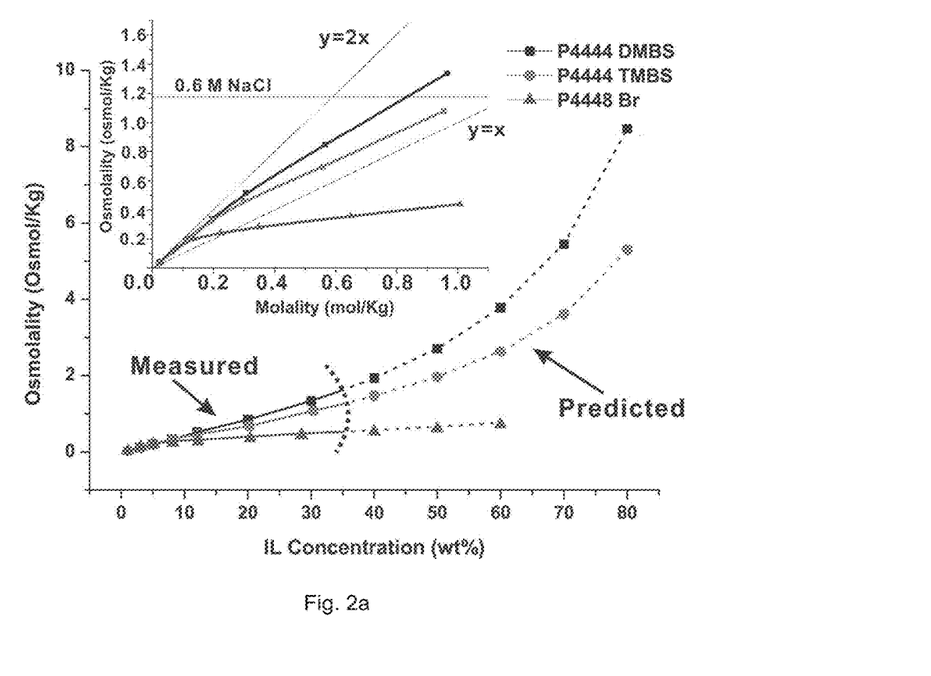
FIG. 2a (inset) is a graph of measured correlation between osmolality and molality of the three draw solutes indicating there is agglomeration besides dissociation of draw solutes, as well as a graph of profile of osmolality as function of draw solution concentration with predicted osmolality according to a simulated function shown in Fig. 6.
Figure 6A:
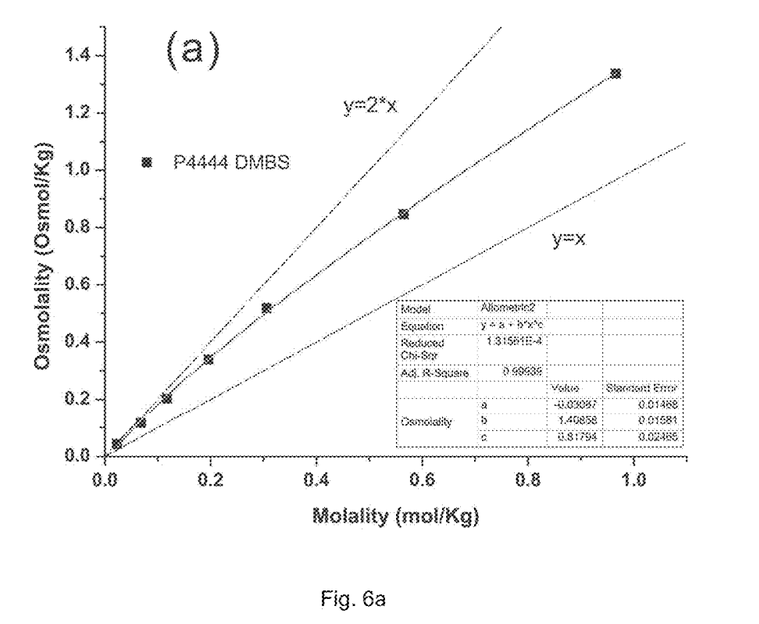
FIG. 6a is a graph of osmolality-molality simulations for $P_{4444}$DMBS at osmolality-measurable concentrations.
Figure 6B:
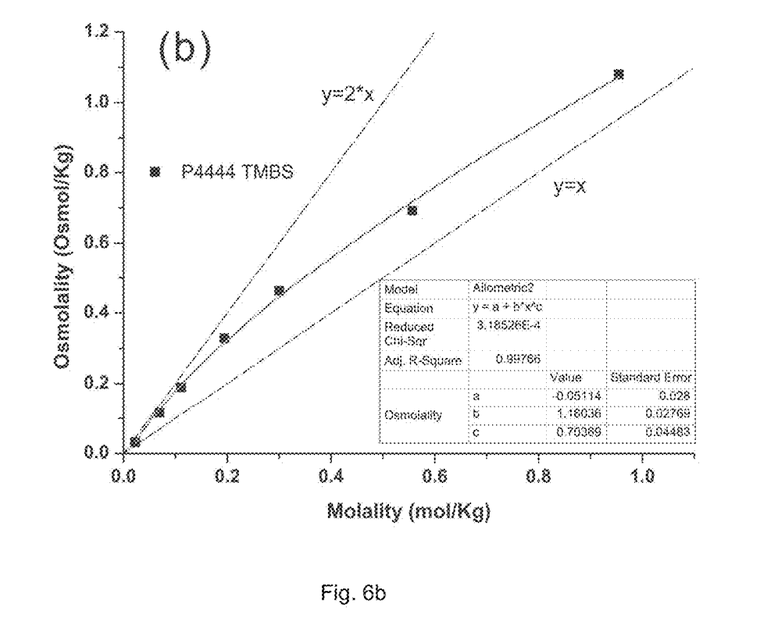
FIG. 6b is a graph of osmolality-molality simulations for $P_{4444}$TMBS at osmolality-measurable concentrations.
Figure 6C:
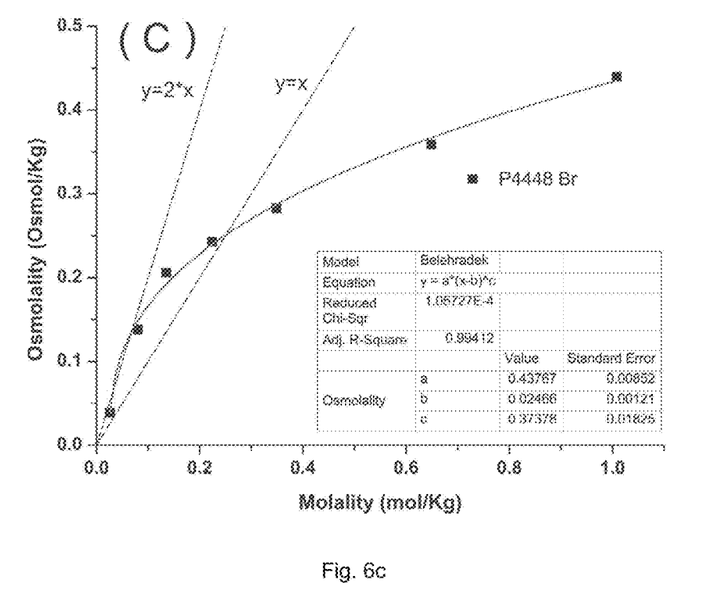
FIG. 6c is a graph of osmolality-molality simulations for $P_{4448}$BR at osmolality-measurable concentrations.
Figure 7:
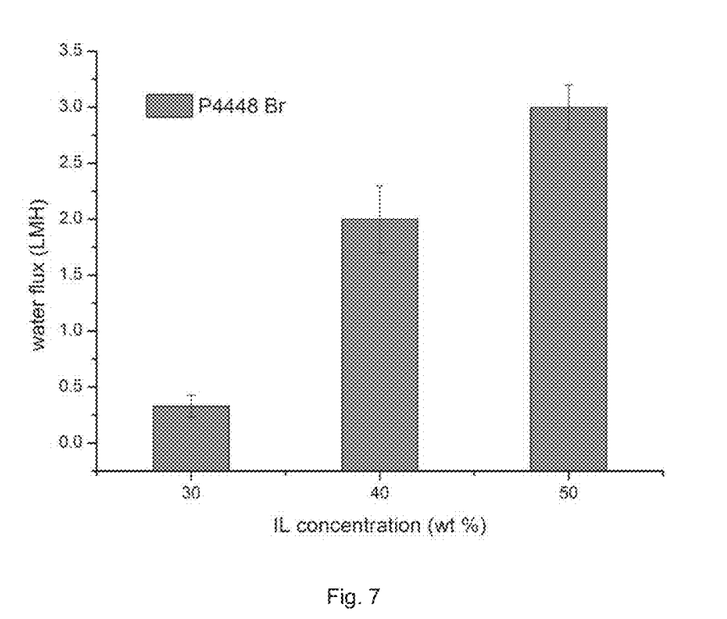
FIG. 7 is a graph of water flux profile of $P_{4448}$Br with different concentrations with feed salinity at 2000 ppm and the temperature at 14±1° C.

FIG. 6 demonstrates the simulations of osmolality-molality correlation of the three draw solutes at low concentrations (<1 mol/Kg, ~30 wt %). The simulated functions were applied to predict the osmolality-concentration correlation for high concentrations. The conversion formula between molality and weight concentration is:

$$wt = molality \times Mw / [(molality \times Mw) + 1000]$$

where Mw is the molecular weight of draw solutes and wt is the weight concentration. From this prediction, 70 wt % $P_{4444}DMBS$ is predicted to assume an osmolality of about 5 osmol/Kg as shown in FIG. 2a. While we practically measured that 70 wt % $P_{4444}DMBS$ can generate a water flux of ~0.3 LMH from 1.6 M NaCl solution at 14° C., which means that 70 wt % $P_{4444}DMBS$ should have osmolality higher than 3.2 osmol/Kg at 14° C. Considering that the osmolality was measured and predicted at subzero degree and the osmolality increases with temperature decreases, the prediction should be reliable to undergrid the drawing ability.

Results and Discussion

FIG. 1 represents the entire FO desalination processes using an, e.g., 70 wt %, aqueous solution of the thermally responsive ionic liquids as the draw solution. Driven by osmotic pressure difference, desalinated water automatically permeates through the membrane from the feed solution, e.g., seawater, to dilute the draw solution in the FO process. While in the draw solute regeneration process, the diluted draw solution, e.g., 30 wt %, after FO undergoes a liquid-liquid phase separation at a temperature above the LCST of the ionic liquid. The draw solute concentration in the supernatant is much reduced to typically less than 10 wt % and high quality water is obtained by a highly energy efficient low pressure nanofiltration (NF) process (see detailed discussion later concerning energy consumption estimation). Both the retentate in NF and the sedimentation from phase separation are solutions with high ionic liquid (IL) concentrations exceeding 70 wt %, which can be pumped back to be used as draw solution again without the need of any further treatment in the FO process to form a closed loop.

Draw Solutes Performance in FO Process

The design of draw solutes of the present invention conforms to the balance in generating high osmotic pressure and ease of regeneration. Unlike traditional ionic liquids which either dissolve (hydrophilic) or repel water (hydrophobic), the thermally responsive ionic liquids of the present invention are amphiphilic. The hydrophobicity from the alkyl groups in cations combining hydrophilicity from suitable anions imparts LCST in aqueous solutions. It is worth noting that the balance between hydrophilicity and hydrophobicity is extremely subtle that tiny molecular structure modification would annihilate LCST. For instance, tetrabutylphosphonium benzenesulfonate ($P_{4444}BS$) is highly soluble while tributylhexylphosphonium 2,4-dimethylbenzenesulfonate ($P_{4446}DMBS$) is virtually insoluble in water. The unique characteristics of these ionic liquids as draw solutes can also be seen in the inset of FIG. 2a. The osmolality of these ionic liquids draw solutions increases monotonously or monotonically but not linearly with molality, unlike other conventional electrolytes.[9, 16] At low concentrations (e.g., <0.1 mol/kg or ~5 wt %), all the three ionic liquids fully dissociates into relatively 'free' cations and anions so that their osmolality is approximately twice as the molality as expected for monovalent electrolyte. As their concentrations increase, the osmolality versus molality plots deviate from the linearity. This is believed to be due to a hydrophobic association of the ionic liquid molecules.[27] It also indicates that hydrophobic interaction between $P_{4448}Br$ molecules is the strongest resulting in the most severe deviation from the ideal linear relationship between osmolality and molality. $P_{4444}DMBS$ and $P_{4444}TMBS$ are more hydrophilic and the osmolalities of their 30 wt % (~0.95 mol/Kg) solutions are 1.34 osmol/Kg and 1.08 osmol/Kg, respectively which are already higher than or approaching that of seawater (1.13 osmol/Kg).

Figure 2B:
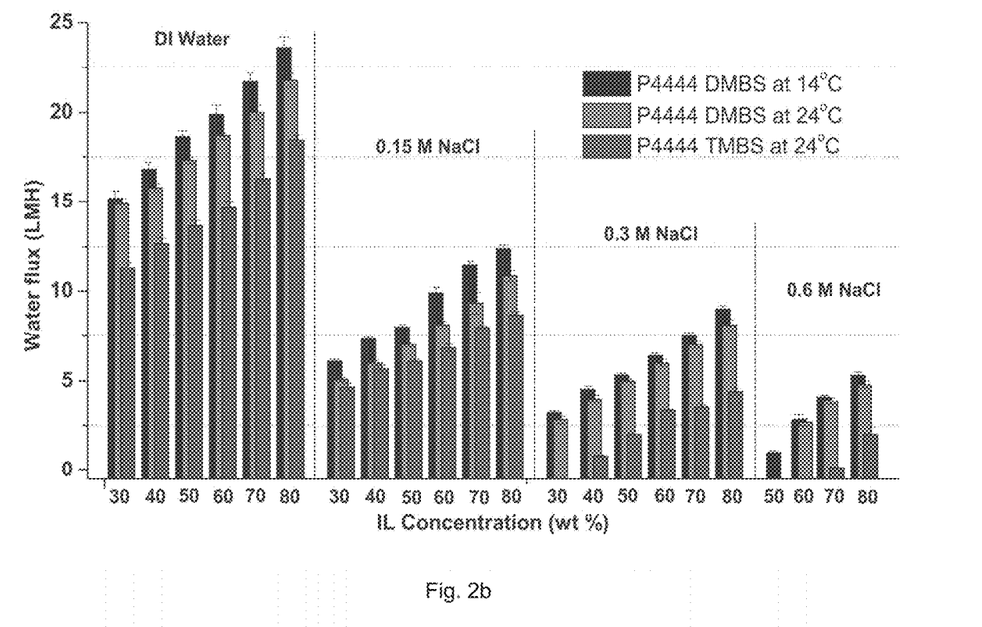
FIG. 2b is a graph of water flux profiles for $P_{4444}$DMBS, and $P_{4444}$ TMBS draw solutions at room temperature and for $P_{4444}$DMBS draw solution at 14±1° C. against different NaCl concentrations.

The osmolality of the draw solutions with higher concentrations cannot be obtained by cryoscopy method. Therefore, the osmolality-molality correlation curves of the three draw solutes were fitted at lower concentrations and extrapolated to higher concentrations (FIG. 2a) with obtained simulated functions (FIG. 6). The calculated osmolality values at higher concentrations presented in FIG. 2a shows that $P_{4444}DMBS$ and $P_{4444}TMBS$ can generate very high osmotic pressures. For instance, the osmolality of a 70 wt % solution is 5.4 osmol/Kg for $P_{4444}DMBS$ and 3.6 osmol/Kg for $P_{4444}TMBS$, which is 4.5 and 3 times of seawater's osmolality, respectively. To further investigate this, FO water flux as a function of draw solution concentration was measured with feed solutions of different salinities for $P_{4444}DMBS$ and $P_{4444}TMBS$ (FIG. 2b). FO measurement was not carried out using $P_{4448}Br$ because it has an osmolality less than 1 osmol/kg up to 60 wt % concentration. As expected, $P_{4444}DMBS$ generates higher water flux than $P_{4444}TMBS$ with the same feed solution salinity since $P_{4444}DMBS$ is the most hydrophilic among the three candidates. It is conceivable that both $P_{4444}DMBS$ and $P_{4444}TMBS$ can generate reasonable water flux from seawater while the most hydrophobic $P_{4448}Br$ can only draw water from low salinity feed solution (FIG. 7), which corroborates the prediction in FIG. 2a inset.

Figure 2C:
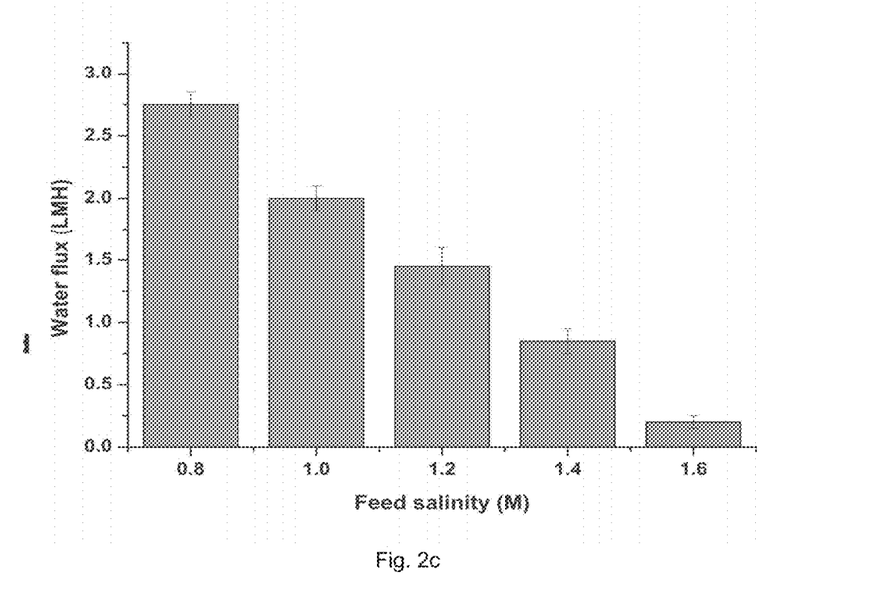
FIG. 2c is a graph of water flux profile at 14±1° C. of 70 wt % $P_{4444}$DMBS draw solution with feed solutions of various salinity above seawater.

However, it is worth noting that the cryoscopic method measures the osmolality at subzero degree Celsius, thus the actual osmolality of LCST-type draw solution at room temperature would be lower. Although based on osmolality (FIG. 2a) 30 wt % (0.95 mol/Kg) of $P_{4444}$DMBS draw solution should start to draw seawater, experimental data (FIG. 2b) indicate that even at 50 wt % of $P_{4444}$DMBS, virtually no drawing is achieved against seawater feed when tested at room temperature (24° C.). It is understandable that lowering the test temperature would result in higher drawing power because of the reduced molecular association and hence higher effective osmotic pressure of the draw solution. In fact, it is believed that this temperature effect is true and applicable to any draw solute having a LCST. When measured at 14±1° C., the water fluxes generated by $P_{4444}$DMBS draw solutions were higher than those measured at room temperature. In fact, at 14±1° C., $P_{4444}$DMBS draw solutions produce reasonable FO water fluxes against RO brine with 1.2 M NaCl. FIG. 2c also shows that, even at 70 wt %, $P_{4444}$DMBS is able to draw water from a NaCl feed solution with 1.6 M or 9.3% salinity (approximately 2.7 times that of seawater). Such high drawing ability is unprecedented among previously reported smart or responsive draw solutes. It is attributable to the unique molecular structures of these ionic liquids which give rise to a delicate balance of characteristics of being ionic while possessing LCST through hydrophobic interaction. More importantly the results indicate the promising potentials of further developing this new class of draw solutes for process water treatment and other applications in addition to seawater desalination via FO.

Draw Solutes Regeneration

Figure 3A:
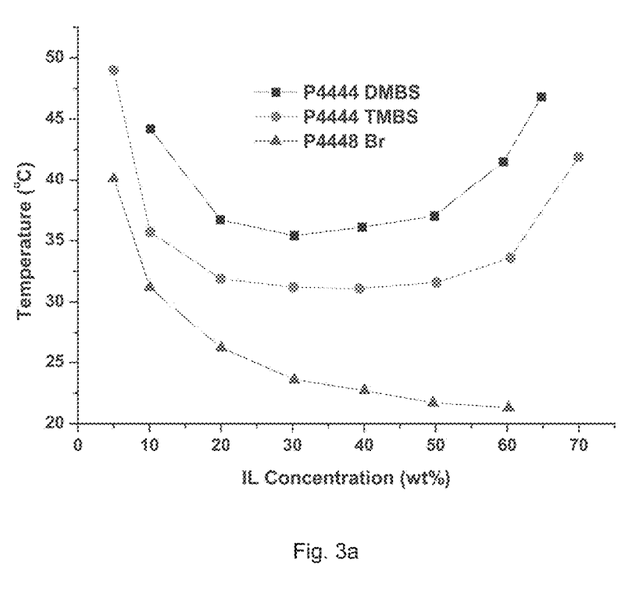
FIG. 3a is a graph of LCST as a function of draw solute concentration.

After the FO process, the diluted draw solution is ready for regeneration process where draw solute is separated from water. FIG. 3a demonstrates that even the most hydrophilic $P_{4444}$DMBS has a LCST only less than 20° C. above room temperature, making it convenient to utilize solar energy or waste heat to realize the phase separation. All these three draw solutes have a concentration-dependent LCST. Interestingly, the LCST decreases monotonously when draw solution of $P_{4444}$DMBS or $P_{4444}$TMBS is diluted from 70 wt % to 30 wt %, which helps minimize thermal energy needed for phase separation before regeneration process.

Figure 3B:
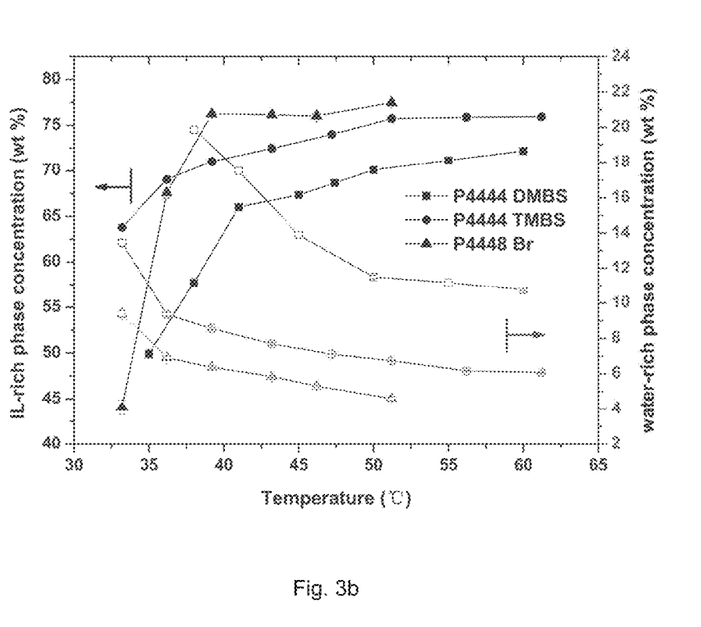
FIG. 3b is a graph of draw solute concentrations in supernatant and sedimentation after phase separation as a function of temperature (initial concentration fixed at 30 wt %).

When each draw solute's concentration was fixed at 30 wt %, as shown in FIG. 3b, all three draw solutes have more complete phase separation as temperature increases above LCST, namely, higher concentration in the sedimentation while lower concentration in the supernatant. When the temperature is raised about 13° C. above the LCST, the concentrations in both sedimentation and supernatant reach a plateau. Further temperature increase would not tremendously decrease draw solute concentration in the supernatant or increase draw solute concentration in the sedimentation. This is because as shown in FIG. 2a, severely diluted or concentrated draw solution does not have LCST or rather phase separation.

Figure 3C:
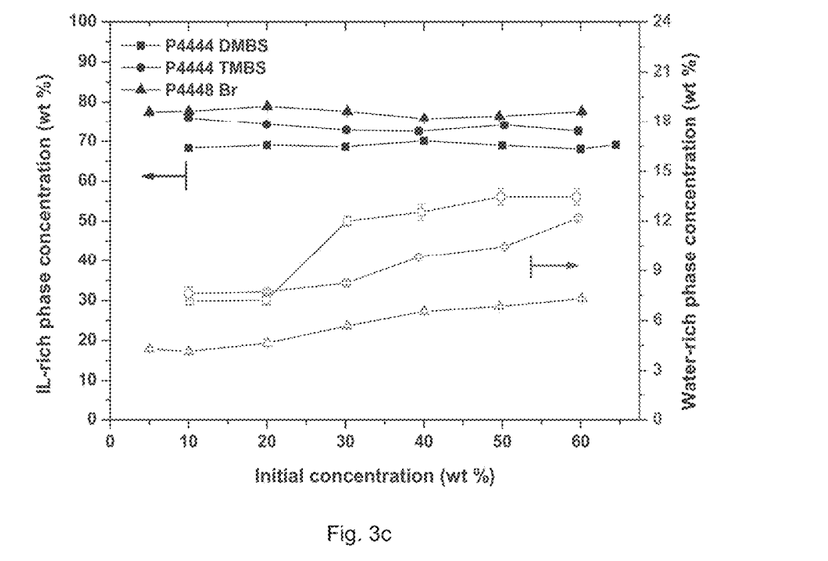
FIG. 3c is a graph of draw solute concentration in supernatant and sedimentation at 13° C. above LCST of corresponding initial concentration.
Figure 3D:
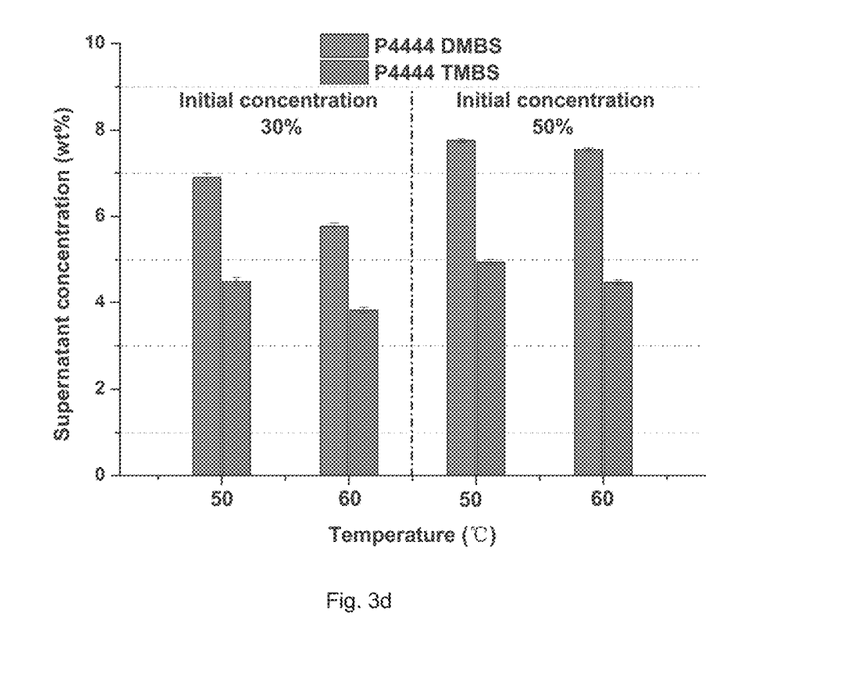
FIG. 3d is a graph of concentration of supernatant regenerated in pressurized NF filtration.
Figure 4:
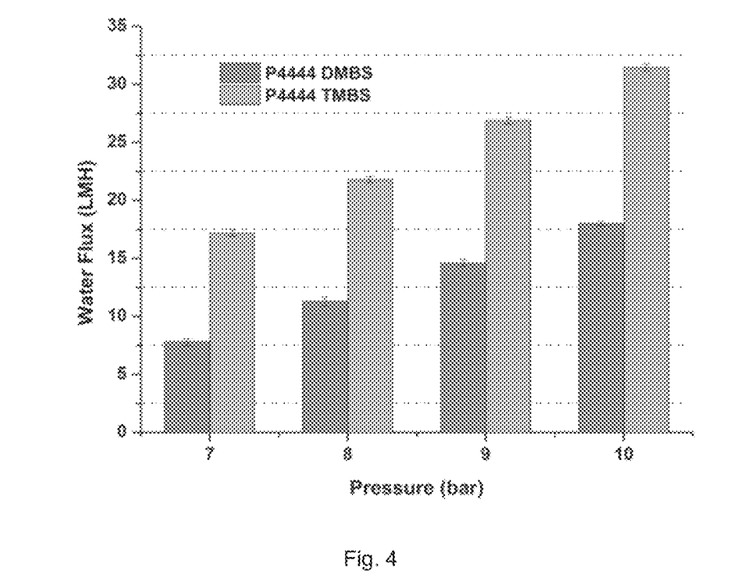
FIG. 4 is a graph of water flux and hydraulic pressure correlation in regeneration process.
Figure 8:
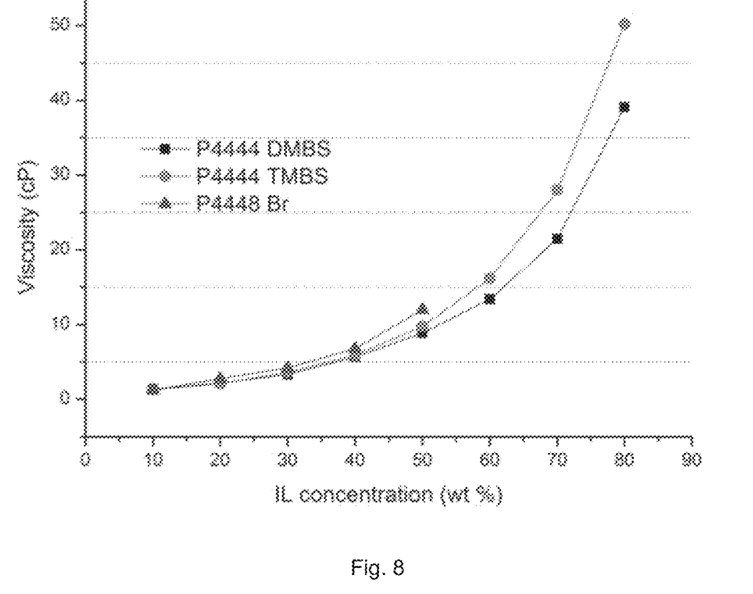
FIG. 8 is a graph of viscosity profiles of the three draw solutions where $P_{4448}$ Br was measured at 16° C. while the others were measured at 23° C.
Figure 9:
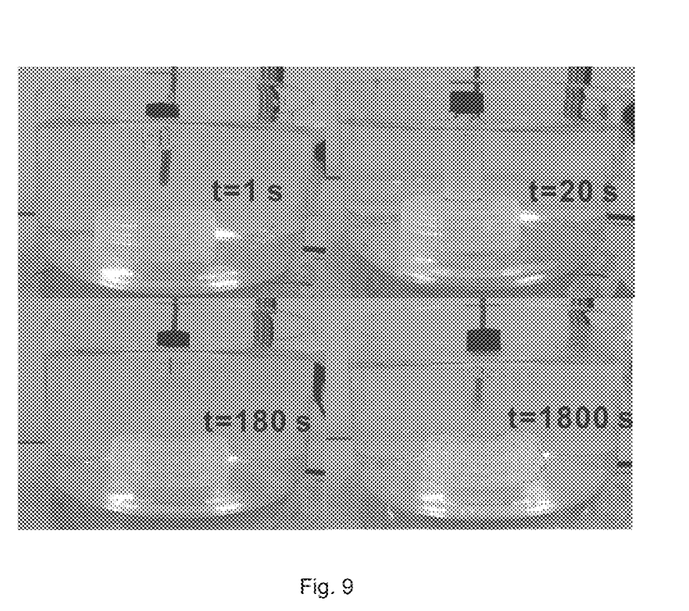
FIG. 9 is a composite photograph of phase separation as function of time where water bath temperature was 50° C. and draw solute was $P_{4444}$ DMBS at 40%, and wherein white plastic visible under each vial is provided for avoiding direct contact with the hot plate.

FIG. 3c demonstrates the phase separation of the three draw solutes with various initial concentrations at 13° C. higher than its corresponding LCST. The sedimentation concentration is quite stable, which is about 70 wt %, 75 wt % and 78 wt % respectively for $P_{4444}$DMBS, $P_{4444}$TMBS and $P_{4448}$Br regardless of initial concentration. However, the supernatant concentrations given in FIG. 3b and FIG. 3c may have been somewhat over-estimated due to the phase-separated but un-precipitated droplets of IL-rich phase in the supernatants (FIG. 8). The actual supernatant concentrations should be lower. For instance, FIG. 3c shows the supernatant concentration is ~13 wt % for a $P_{4444}$DMBS solution with initial concentration of 50 wt % at 50° C. (13° C. above its LCST), but this is impossible because, based on FIG. 3a, it is clear that a 13 wt % $P_{4444}$DMBS cannot be a single phase solution and should have phase separated at 50° C. In order to remove such tiny droplets, the supernatant was isothermally filtered with a 220 nm microfiltration membrane, and it was found that the supernatant concentration is below 8 wt % and 5 wt % for $P_{4444}$DMBS and $P_{4444}$TMBS, respectively at temperature of 50° C. or above (FIG. 3d). The low concentration in the supernatant minimizes the pressure needed in the NF filtration process to produce purified water.

Energy Consumption Estimation

The theoretical minimum energy required to separate solute from solvent is a close function of a solution's osmotic pressure and water recovery:

$$W_{min} = V_w * \Pi * \ln(1/(1-Y))/Y \quad (1)$$

where
$V_w$ is molar volume of water,
$\Pi$ is the osmotic pressure,
$Y$ is the water recovery.

When the water recovery is zero, the energy needed to remove infinitesimally small amount of water from solution is:

$$W_0 = V_w * \Pi \quad (2)$$

Currently, RO for seawater desalination has an energy consumption[2] that is above 2 kWh/m$^3$ with imposed hydraulic pressure of over 60 bar. For the thermally responsive draw solutes of the present invention, their osmotic pressures were reduced below 6 bar with the aid of "free" industrial waste heat or solar energy. As shown in FIG. 3, low hydraulic pressure of 10 bar is sufficient to produce reasonable water flux of 31 LMH ($P_{4444}$TMBS) and 18 LMH ($P_{4444}$DMBS) with nanofiltration membrane (MWCO ~270 Da). It is worth emphasizing that in seawater RO, the hydraulic pressure needed increases as seawater is concentrated. However, for separating water from the diluted draw solution, as water is recovered and draw solution is concentrated over 10 wt % ($P_{4444}$DMBS) and 5 wt % ($P_{4444}$TMBS), their LCST is regained and phase separation can be achieved with "free" thermal energy. Therefore, theoretically, the hydraulic pressure needed in regeneration would never exceed the osmotic pressure of 10 wt % $P_{4444}$DMBS and 5 wt % $P_{4444}$ TMBS, and almost all the water in the supernatant would be recovered.

The osmotic pressure of 10 wt % $P_{4444}$DMBS was conservatively substituted into equation 2, and the minimum energy requirement with $P_{4444}$DMBS as the draw solute in FO seawater desalination is found to be 0.253 kWh/m$^3$, only 23% of that needed for seawater RO with 50% recovery (1.09 kWh/m$^3$). This indicates that FO desalination technology with the novel draw solutes of the present invention is promising to reduce energy consumption for current seawater desalination, if abundant "free" thermal energy could be obtained from the sun or industrial waste heat. The draw solute concentration in the permeate of NF was below 900 mg/l and the water quality was still too bad for direct drinking. Thus the water was further treated with NF (MWCO ~90 Da) and the permeate has a good quality of total organic carbon (TOC) about 20 mg/L. Since the osmotic pressure of the first NF permeate is so low (~0.09 bar), industrially pumping pressure (2-3 bar) would be sufficient and we regard the energy consumption in second NF negligible.

Figure 10:
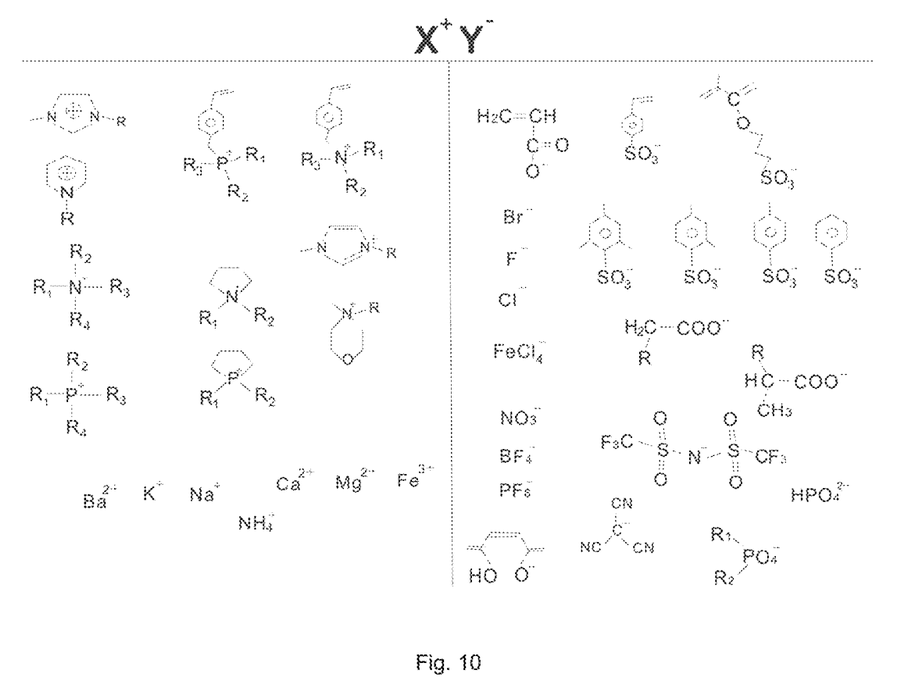
FIG. 10 is a list of cations and anions that may be comprised in the draw solute of the present invention.

Whilst there has been described in the foregoing description exemplary embodiments of the present invention, it will be understood by those skilled in the technology concerned that many variations in details of design, construction and/or operation may be made without departing from the present invention. For example, besides the three solutes tetrabutylphosphonium 2,4-dimethylbenzenesulfonate ($P_{4444}$DMB S), tetrabutylphosphonium mesitylenesulfonate ($P_{4444}$TMBS) and tributyloctyl-phosphonium bromide ($P_{4448}$Br) described above, it is envisaged that the draw solute of the present invention may comprise other ionic liquids and organic or organic-inorganic hybrid salts made up of organic/inorganic cations and organic/inorganic anions. The organic/inorganic cations in the ionic liquids/salts may be selected from phosphoniums, ammoniums, imidazoliums, pyridiniums, pyrrolidiniums, sulfoniums, and/or metallic ions etc. The organic/inorganic anions in the ionic liquids/salts may be selected from halides, sulfonates, alkyl sulfates, tosylates, methane sulfonates, nitrides, carboxylates, alkoxides, tetrafluoroborate, hexafluorophosphates, and/or bis(trifluoromethylsulfonyl)imides etc. Examples of the cations (X) and anions (Y) mentioned above are shown in FIG. 10, in which R and $R_1$-$R_3$ may independently represent H, OH, a halogen, CN (cyanide), or $C_{1-8}$ alkyl group (straight or branched). The thermally responsive draw solutes may also comprise zwitterions compounds. Alternatively to liquid-liquid phase separation as described above, the draw solute may be recovered or regenerated by solid-liquid phase separation due to solubility transition (e.g. at an Upper or Lower Critical Solution Temperature—UCST or LCST of the ionic liquids/salts). Examples of the ionic compound in the draw solute being regenerated at a temperature above its UCST include 1-butyl-3-methylimidazonium tricyanomethanide and $Na_2HPO_4$.

REFERENCES

1. P. Aldhous, *Nature*, 2003, 422, 251.
2. M. Elimelech and W. A. Phillip, *Science*, 2011, 333, 712.
3. M. F. A. Goosen, S. S. Sablani, H. Al-Hinai, S. Al-Obeidani, R. Al-Belushi and D. Jackson, *Separation Science and Technology*, 2005, 39, 2261.
4. A. Bajpayee, T. Luo, A. Muto and G. Chen, *Energy & Environmental Science*, 2011, 4, 1672.
5. K. N. Knust, D. Hlushkou, R. K. Anand, U. Tallarek and R. M. Crooks, *Angew Chem Int Ed Engl*, 2013, 52, 8107-8110.
6. C. Klaysom, T. Y. Cath, T. Depuydt and I. F. J. Vankelecom, *Chemical Society Reviews*, 2013, 42, 6959.
7. B. Mi and M. Elimelech, *Journal of Membrane Science*, 2010, 348, 337.
8. C. Tan and H. Ng, *Desalination and Water Treatment*, 2010, 13, 356.
9. M. L. Stone, A. D. Wilson, M. K. Harrup and F. F. Stewart, *Desalination*, 2013, 312, 130.
10. Q. Ge, J. Su, G. L. Amy and T. S. Chung, *Water Res*, 2012, 46, 1318.
11. R. E. Kravath and J. A. Davis, *Desalination*, 1975, 16, 151.
12. Q. Ge and T.-S. Chung, *Chemical Communications*, 2013, 49, 8471.
13. Q. Zhao, N. Chen, D. Zhao and X. Lu, *ACS Applied Materials & Interfaces*, 2013, 5, 11453.
14. Z. Liu, H. Bai, J. Lee and D. D. Sun, *Energy & Environmental Science*, 2011, 4, 2582.
15. Y. Cai, W. Shen, R. Wang, W. B. Krantz, A. G. Fane and X. Hu, *Chemical Communications*, 2013, 49, 8377.
16. M. L. Stone, C. Rae, F. F. Stewart and A. D. Wilson, *Desalination*, 2013, 312, 124.
17. Y. C. Kim, S. Han and S. Hong, *Water Science & Technology*, 2011, 64, 469.
18. Y. Cai, W. Shen, S. L. Loo, W. B. Krantz, R. Wang, A. G. Fane and X. Hu, *Water Res*, 2013, 47, 3773.
19. R. Ou, Y. Wang, H. Wang and T. Xu, *Desalination*, 2013, 318, 48.
20. B. K. Jung, J. E. Kim, S. S. Han, H. Kang, H. R. Kang and J. Im HAN, U.S. patent application Ser. No. 13/845,471, 2013.
21. Y. Mok, D. Nakayama, M. Noh, S. Jang, T. Kim and Y. Lee, *Phys Chem Chem Phys*, 2013, 15, 19510.
22. J. R. McCutcheon, R. L. McGinnis and M. Elimelech, *Desalination*, 2005, 174, 1.
23. K. E. Gutowski, G. A. Broker, H. D. Willauer, J. G. Huddleston, R. P. Swatloski, J. D. Holbrey and R. D. Rogers, *Journal of the American Chemical Society*, 2003, 125, 6632.
24. K. Fukumoto and H. Ohno, *Angew Chem Int Ed Engl*, 2007, 46, 1852.
25. S. Saita, Y. Kohno and H. Ohno, *Chemical Communications*, 2013, 49, 93.
26. J. Wei, C. Qiu, C. Y. Tang, R. Wang and A. G. Fane, *Journal of Membrane Science*, 2011, 372, 292.
27. L. Zhang, Z. Xu, Y. Wang and H. Li, *The Journal of Physical Chemistry B*, 2008, 112, 6411.
28. R. L. McGinnis and M. Elimelech, *Desalination*, 2007, 207, 370.
29. R. Semiat, *Environmental Science & Technology*, 2008, 42, 8193.
30. C. P. Fredlake, J. M. Crosthwaite, D. G. Hert, S. N. Aki and J. F. Brennecke, Journal of Chemical & Engineering Data, 2004, 49, 954-964.
31. D. Batra, D. N. Hay and M. A. Firestone, Chemistry of Materials, 2007, 19, 4423-4431.

The invention claimed is:

1. A forward osmosis draw solution system for desalination at room temperature of feedwater having salinity of at least 0.6M, the forward osmosis draw solution system comprising:
   a forward osmosis unit, the forward osmosis unit comprising:
      a forward osmosis draw solution that comprises an aqueous solution of a thermally responsive ionic compound comprising at least 60 wt % of the thermally responsive ionic compound, the aqueous solution having a lower critical solution temperature (LCST) where the thermally responsive ionic compound comprises one of: tetrabutylphosphonium 2,4-dimethylbenzenesulfonate ($P_{4444}$DMBS), tetrabutylphosphonium mesitylenesulfonate ($P_{4444}$TMBS), or tributyloctyl-phosphonium bromide ($P_{4448}$Br), and where the LCST of the aqueous solution is in the range of 32° C. to 49° C.;
   feedwater having salinity of at least 0.6M;
   a membrane disposed between the forward osmosis draw solution and the feedwater; and
   a heater configured to receive the aqueous solution from the forward osmosis unit and heat the aqueous solution from a temperature below the LCST of the aqueous solution to a temperature above the LCST of the aqueous solution,
   wherein the thermally responsive ionic compound is regeneratable via one of: liquid-liquid phase separation and solid-liquid phase separation from a diluted form of the forward osmosis draw solution obtained after forward osmosis has been performed using the forward osmosis draw solution, and wherein the thermally responsive ionic compound is regeneratable when the diluted form of the forward osmosis draw solution is at a temperature above the LCST.

2. The forward osmosis draw solution system of claim 1, wherein the thermally responsive ionic compound comprises an organic cation and an organic anion.

3. The forward osmosis draw solution system of claim 1, wherein the thermally responsive ionic compound comprises an organic ion and an inorganic ion, wherein the organic ion is one of: a cation and an anion, and wherein the inorganic ion is the other of: the cation and the anion.

4. The forward osmosis draw solution system of claim 1, wherein the thermally responsive ionic compound comprises a zwitterion.

5. The forward osmosis draw solution system of claim 1, wherein the thermally responsive ionic compound is amphiphilic.

6. The forward osmosis draw solution system of claim 1, wherein a sedimentation phase of one of: the liquid-liquid phase separation and solid-liquid phase separation is directly reusable as the forward osmosis draw solution.

7. The forward osmosis draw solution system of claim 1, wherein osmolality of the forward osmosis draw solution increases monotonically and not linearly with molality of the forward osmosis draw solution.

8. A method of regenerating a forward osmosis draw solution comprising:
providing a forward osmosis draw solution comprising an aqueous solution of a thermally responsive ionic compound comprising at least 60 wt % of the thermally responsive ionic compound, the thermally responsive ionic compound having a lower critical solution temperature (LCST), where the thermally responsive ionic compound comprises one of: tetrabutylphosphonium 2,4-dimethylbenzenesulfonate ($P_{4444}$DMBS), tetrabutylphosphonium mesitylenesulfonate ($P_{4444}$TMBS), or tributyloctyl-phosphonium bromide ($P_{4448}$Br), and where the LCST of the aqueous solution is in the range of 32° C. to 49° C.;
performing forward osmosis on a feedwater having a salinity of at least 0.6M with the forward osmosis draw solution;
heating the aqueous solution from a temperature below the LCST of the aqueous solution to a temperature above the LCST of the aqueous solution; and
regenerating the thermally responsive ionic compound via one of: liquid-liquid phase separation or solid-liquid phase separation from a diluted form of the forward osmosis draw solution obtained after forward osmosis has been performed using the forward osmosis draw solution, and wherein the thermally responsive ionic compound is regeneratable when the diluted form of the forward osmosis draw solution is at a temperature above the LCST.

9. The method of claim 8, wherein the thermally responsive ionic compound comprises an organic cation and an organic anion.

10. The method of claim 9, wherein the cation is one selected from the group consisting of: phosphonium, ammonium, imidazolium, pyridinium, pyrrolidinium, sulfonium, morpholinium and a metallic cation, and wherein the anion is one selected from the group consisting of: halide, sulfonate, alkylsulfate, tosylate, methane sulfonate, nitride, carboxylate, alkoxide, tetrafluoroborate, hexafluorophosphates, dihydrogen phosphate, tricyanomethanide and bis(trifluoromethylsulfonyl)imide.

11. The method of claim 8, wherein the thermally responsive ionic compound comprises an organic ion and an inorganic ion, wherein the organic ion is one of: a cation and an anion, and wherein the inorganic ion is the other of: the cation and the anion.

12. The method of claim 8, wherein the thermally responsive ionic compound comprises a zwitterion, or wherein the thermally responsive ionic compound is amphiphilic.

13. The method of claim 8, wherein a sedimentation phase of one of: the liquid-liquid phase separation or the solid-liquid phase separation is directly reusable as the forward osmosis draw solution.

14. The method of claim 8, wherein osmolality of the forward osmosis draw solution increases monotonically and not linearly with molality of the forward osmosis draw solution.

* * * * *